(12) United States Patent
Chan et al.

(10) Patent No.: US 7,464,228 B2
(45) Date of Patent: Dec. 9, 2008

(54) SYSTEM AND METHOD TO CONSERVE CONVENTIONAL MEMORY REQUIRED TO IMPLEMENT SERIAL ATA ADVANCED HOST CONTROLLER INTERFACE

(75) Inventors: Wai-Ming Richard Chan, Austin, TX (US); Wei Liu, Austin, TX (US); Ching-Lung Chao, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 244 days.

(21) Appl. No.: 11/421,360

(22) Filed: May 31, 2006

(65) Prior Publication Data

US 2007/0283118 A1    Dec. 6, 2007

(51) Int. Cl.
*G06F 13/10*    (2006.01)
*G06F 12/06*    (2006.01)

(52) U.S. Cl. .................. 711/153; 711/173; 711/149; 710/5

(58) Field of Classification Search .................. 711/153, 711/173, 149; 710/5, 6; 718/102; 714/5
See application file for complete search history.

(56) References Cited

U.S. PATENT DOCUMENTS

| | | | |
|---|---|---|---|
| 5,590,292 A | 12/1996 | Wooten et al. | 395/825 |
| 5,687,388 A | 11/1997 | Wooten et al. | 395/823 |
| 6,401,140 B1 | 6/2002 | Wu | 710/10 |
| 6,978,018 B2 | 12/2005 | Zimmer | 380/30 |
| 7,228,406 B2 | 6/2007 | Garney | 713/1 |
| 2003/0074491 A1* | 4/2003 | Cepulis | 710/2 |
| 2005/0144476 A1* | 6/2005 | England et al. | 713/200 |
| 2006/0075164 A1* | 4/2006 | Ooi | 710/58 |
| 2006/0107129 A1* | 5/2006 | Franklin et al. | 714/710 |
| 2006/0117274 A1* | 6/2006 | Tseng et al. | 716/1 |
| 2006/0248241 A1* | 11/2006 | Danilak | 710/36 |
| 2007/0005869 A1* | 1/2007 | Balraj et al. | 711/2 |

OTHER PUBLICATIONS

"Serial ATA Advanced Host Controller Interface (AHCI) Specification," Revision 1.0 (Amber Huffman and Intel, available from www.intel.com/technology/serialata/ahci.htm, Apr. 13, 2004), pp. i-vi, 1-5, 24-30, and 66-77.*

* cited by examiner

*Primary Examiner*—Tuan V. Thai
*Assistant Examiner*—Hal Schnee
(74) *Attorney, Agent, or Firm*—Baker Botts L.L.P.

(57) ABSTRACT

An information handling system includes a processor and a system memory coupled to the processor. The system has a plurality of persistent mass storage devices including first and second storage devices. A device controller includes a first port operably connected to the first storage device and a second port operably connected to the second storage device. The controller transfers data between system memory and the storage devices. System firmware includes instructions to configure the controller to define a first command list and frame information structure (FIS) associated with the first port and a second command list and FIS associated with the second port where the first and second command lists share a common block of system memory.

19 Claims, 4 Drawing Sheets

SYSTEM AND METHOD TO CONSERVE CONVENTIONAL MEMORY REQUIRED TO IMPLEMENT SERIAL ATA ADVANCED HOST CONTROLLER INTERFACE

TECHNICAL FIELD

The present invention is related to the field of computer systems and more specifically to a system and method for implementing Serial ATA devices in a computer system.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems have or support two or more distinct operational environments. Immediately following power on or system reset, the system processor begins to execute in an operational mode referred to as real mode. Real mode execution is required on x86 based systems to guarantee backwards compatibility with legacy systems. The real mode environment is, in at least two respects, a restrictive environment because the accessible memory space is relatively small and because multithreaded execution is not supported.

While in the real mode operating environment, information handling systems generally identify and configure the system resources including peripheral devices. Configuring peripheral devices such as persistent storage devices is especially important because these devices usually contain the system's operating system code. Therefore, the ability to communicate in real mode with persistent storage is essential.

For many years, the persistent storage market was dominated by devices that were compliant with Advanced Technology Attachment (ATA). ATA, which is also commonly referred to as IDE (Integrated Drive Electronics) is an interface for connecting storage devices including hard disks and CD ROM devices to an information handling system such as a desktop, laptop, or server class computer system. ATA, which is a parallel interface, was retroactively referred to as Parallel ATA (PATA) with the 2003 introduction of the Serial ATA (SATA) interface.

Serial ATA improves on PATA in at least three ways. Serial ATA interconnects can be longer than PATA interconnects, Serial ATA interconnects have a substantially smaller profile than PATA interconnects, and Serial ATA is substantially faster than PATA. Because of these advantages, Serial ATA has rapidly and substantially displaced Parallel ATA as the storage interface of choice for most system manufacturers and vendors.

With the rapid acceptance of Serial ATA, SATA device manufacturers and system manufacturers alike are anxious to standardize on a controller implementation. Advanced Host Controller Interface (AHCI) is a specification for one such implementation. AHCI controllers support as many as 32 ports, each of which may be attached to a SATA device.

Among other things, AHCI specifies numerous data structures used by AHCI controllers. These data structures include port specific data structures including, as an example, command lists. An instance of each port specific AHCI data structure, not surprisingly, is required for each AHCI controller port. For a 32 port controller, the port specific data structures can consume a substantial amount of memory. The memory required to implement AHCI controllers may be especially problematic in an operating environment, such as the real mode operating environment, characterized by a limited memory space.

SUMMARY OF THE INVENTION

Therefore a need has arisen for a system and method to implement persistent mass storage controllers with a memory aware approach that recognizes the demand for limited memory space, especially in the real mode or other memory restricted operating environment.

The present disclosure describes a system and method for implementing and configuring persistent mass storage device controllers in a functional state while conserving the system memory space required.

In one aspect, an information handling system as disclosed includes a processor and a system memory coupled to the processor. The system has a plurality of persistent mass storage devices including first and second storage devices. A device controller includes a first port operably connected to the first storage device and a second port operably connected to the second storage device. The controller transfers data between system memory and the storage devices. System firmware includes instructions to configure the controller to define a first command list associated with the first port and a second command list associated with the second port where the first and second command lists share a common block of system memory.

In another aspect, a disclosed method for implementing persistent mass storage in an information handling system includes configuring a controller of a plurality of persistent mass storage devices to use a shared block of system memory as a data structure (e.g., a command list) for at least two of the storage devices while executing in a real mode operating environment.

In yet another aspect, a disclosed computer program product for implementing persistent mass storage in an information handling system includes computer executable instructions, stored on a computer readable medium, for configuring a controller of a plurality of persistent mass storage devices to use a shared block of system memory as a data structure (e.g., a command list) for at least two of the storage devices while executing in a real mode operating environment.

The present disclosure includes a number of important technical advantages. One technical advantage is the ability to implement a state of the art storage interface and controller in a way that reduces the impact on system memory resources, especially in memory restricted environments. Additional advantages will be apparent to those of skill in the art and from the drawings, description and claims provided herein.

BRIEF DESCRIPTION OF THE DRAWINGS

A more complete and thorough understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Preferred embodiments of the invention and its advantages are best understood by reference to FIG. 1 through FIG. 5 wherein like numbers refer to like and corresponding parts.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Figure 1:
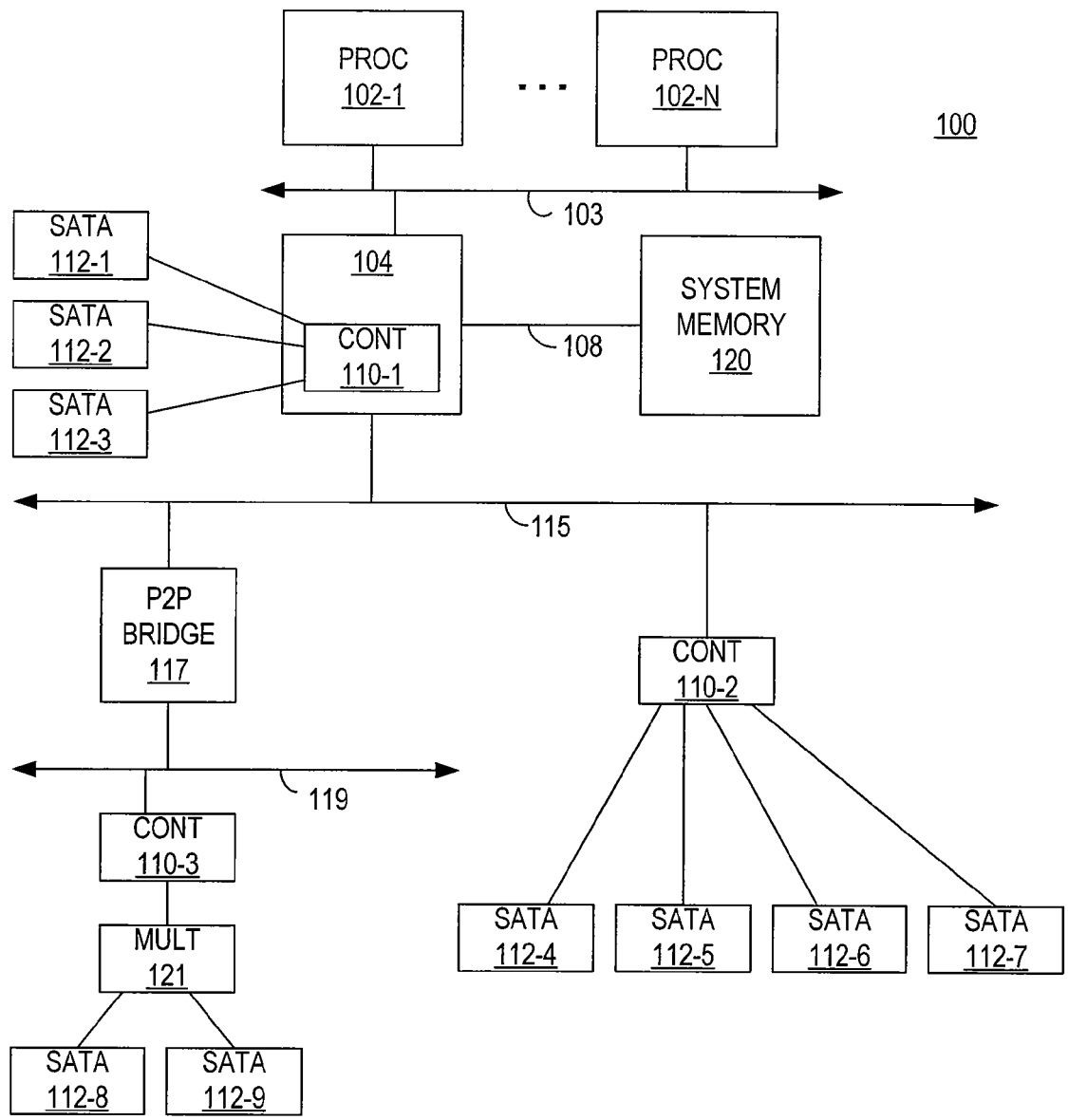
FIG. 1 is a block diagram of selected elements of an information handling system.

Now referring to FIG. 1, a block diagram illustrating selected elements of one embodiment of an information handling system 100 is presented. The elements of system 100 depicted in FIG. 1 emphasize serial ATA devices 112-1 through 112-9 (generically or collectively referred to herein as SATA device(s) 112) and the AHCI controllers 110-1 through 110-3 (generically or collectively referred to herein as AHCI controller(s) 110) wherein at least one AHCI controller 110 is implemented according to the present invention to employ shared system memory space in specified environments for at least some of the AHCI required state including, as examples, the AHCI command list registers and the AHCI FIS (Frame Information Structure) registers.

Using shared register space beneficially conserves system memory and, in some environments, conserves system memory that is in short supply and high demand. In an option ROM implementation, for example, sharing AHCI registers to reduce the configuration space conserves portions of system memory below system memory address 100000h and, more specifically, below system memory address A0000h where there is a great demand for very limited system memory space.

Returning to FIG. 1, the depicted implementation of information handling system 100 includes one or more general purpose processors 102-1 through 102-N (generically or collectively referred to herein as processor(s) 102) sharing access to system bus 103. A core chip set 104, including bus bridge and memory controller, couples system bus 103 to system memory bus 108 and system memory 120. A peripheral bus 115 enables peripheral devices and secondary peripheral busses to communicate with system bus 103. In the depicted embodiment, peripheral bus 115 is representative of any PCI-type of peripheral bus including PCI, PCI/X, PCI-Express, and so forth.

In the depicted embodiment, peripheral bus 115 is connected to a PCI-to-PCI (P2P) bridge 117 that provides an interface between the first or primary peripheral bus 115 and a secondary peripheral bus 119. Although not explicitly depicted in FIG. 1, a variety of peripheral devices and/or peripheral adapters may be connected to peripheral bus 115 and secondary peripheral bus 119. Examples of the types of peripheral devices that may be connected to busses 115 and 119 includes graphics adapters, audio adapters, and network adapters.

As depicted in FIG. 1, information handling system 100 includes persistent mass storage elements implemented as serial ATA (SATA) devices 112-1 through 112-9. Serial ATA devices 112 are well known in the field of information handling system and microprocessor based computer systems. Serial ATA devices 112 as depicted in FIG. 1 are preferably compliant with the current revision of the Serial ATA specification. Serial ATA is a serial mass storage interconnect for the ATA protocol. Serial ATA is a point-to-point interconnect that improves on the speed of conventional or parallel ATA and uses interconnects that are less intrusive interconnects and potentially longer than their parallel ATA ancestors. The Serial ATA Specification is generated and maintained by the Serial ATA International Organization (SATA-IO) and is incorporated by reference herein.

In the depicted embodiment, three different groups of SATA devices 112 are implemented. Each of the three groups includes an AHCI compliant controller 110 that interfaces with the SATA devices 112 in its group. A first group includes an AHCI controller 110-1 implemented within the core chip set 104 and connected to SATA devices 112-1 through 112-3. A second group includes a second AHCI compliant SATA controller 112-2 connected between primary peripheral bus 115 and SATA devices 112-4 through 112-7. A third group includes a third AHCI controller 110-3 connected between secondary peripheral bus 119 and a third group of SATA devices 112-8 through 112-9 via an intervening port multiplier 121. Although the embodiment depicted in FIG. 1 illustrates an architecture including three distinct AHCI controllers 110, other embodiments may include any combination of one or more of the depicted AHCI controllers.

Each AHCI controller 110 is suitable for use as an engine for data movement between system memory 120 and the SATA devices 112 managed by the controller. Each AHCI controller 110 supports as many as 32 ports, each of which may be connected to an SATA device 112. The AHCI specification details registers and other state information for configuring and accessing SATA devices 112. The AHCI registers are located or implemented in AHCI memory, which is physical memory implemented in the AHCI controller silicon.

The AHCI specification defines, as examples, configuration registers and memory registers. The specified memory registers include a set of port registers. A separate set of port registers is defined for each AHCI port. If, for example, an implementation includes an AHCI controller connected to the maximum of 32 SATA devices, 32 sets of AHCI port registers are used.

The AHCI port registers include registers defining a command list and a Frame Information Structure (FIS). The AHCI command list registers indicate the physical base address of a command list for the corresponding port while the FIS registers define a physical base address for a received FIS. AHCI specifies that a command list is a 1 KB structure and that a FIS is a 256 B structure. With a total of 32 ports, therefore, a maximally implemented AHCI controller consumes 40 KB of system memory for the FIS and the command list.

In the context of desktop and server systems possessing hundreds or even thousands of megabytes of system memory, the 40 KB or so required to configure an AHCI controller is relatively insignificant. However, a vast installed base of information handlings systems execute in a real mode operating environment following reset. Real mode is a memory-limited operating mode that is necessitated by backwards compatibility issues associated with x86-based systems. Following reset, x86 processors start executing code in real mode until an operating system is loaded and a protected mode of execution is enabled. A processor running in real-mode can exploit only the lowest 20 bits of its address bus and is therefore limited to a 1 MB memory space.

In the real mode operating environment, the 40 KB of memory consumed by an AHCI controller is substantial. Moreover, because the AHCI command lists and FIS blocks must be in writable memory space that is protected from the operating system, the 40 KB of AHCI system memory is most suitably located in the Extended BIOS Data Area (EBDA) of system memory although it may also be included in Option ROM shadow space. The EBDA is a variable size system memory block that terminates at physical address A0000 (because all system memory addresses presented herein are hexadecimal unless indicated to the contrary, conventional hexadecimal notation such as the prefix "0x" or the suffix "h" is omitted). The portion of system memory address space below A0000 not dedicated to EBDA (and above 0500, which is reserved for interrupts and BIOS data) is the only free RAM space available in real mode. An increase in the size of EBDA therefore causes a corresponding decrease in the free RAM accessible in real mode.

Those familiar with the design of x86 based information handling systems will readily appreciate that the real mode free RAM space, which is less than 640 KB, is considered to be a premium resource that should be allocated sparingly. A method and a system described herein beneficially conserve this precious resource by recognizing that the configuration space specified for an AHCI controller assumes that the system is running in a protected mode environment where, for example, different threads may be accessing different AHCI controller ports at the same time. In a single task environment such as real mode, the AHCI controller can be implemented in a manner that enables controller functionality while dramatically reducing the amount of system memory allocated to controller configuration.

Some embodiments of the described technique for implementing a persistent mass storage device controller may be implemented as a computer program product in the form of computer executable instructions stored on a computer readable medium. The computer readable medium may be any form of storage medium including hard disks, floppy disks, CD, magnetic tape, or the like. In some embodiments, portions of the computer program product is implemented as firmware, in which the computer executable instructions are stored on a non volatile storage device, such as a ROM or flash memory device, operably coupled to processor and accessible to and executable by the processor substantially immediately after a system reset. In these embodiments, the firmware is preferably physically attached to the same printed circuit board as the processor (e.g., as part of the core chipset).

Figure 2:
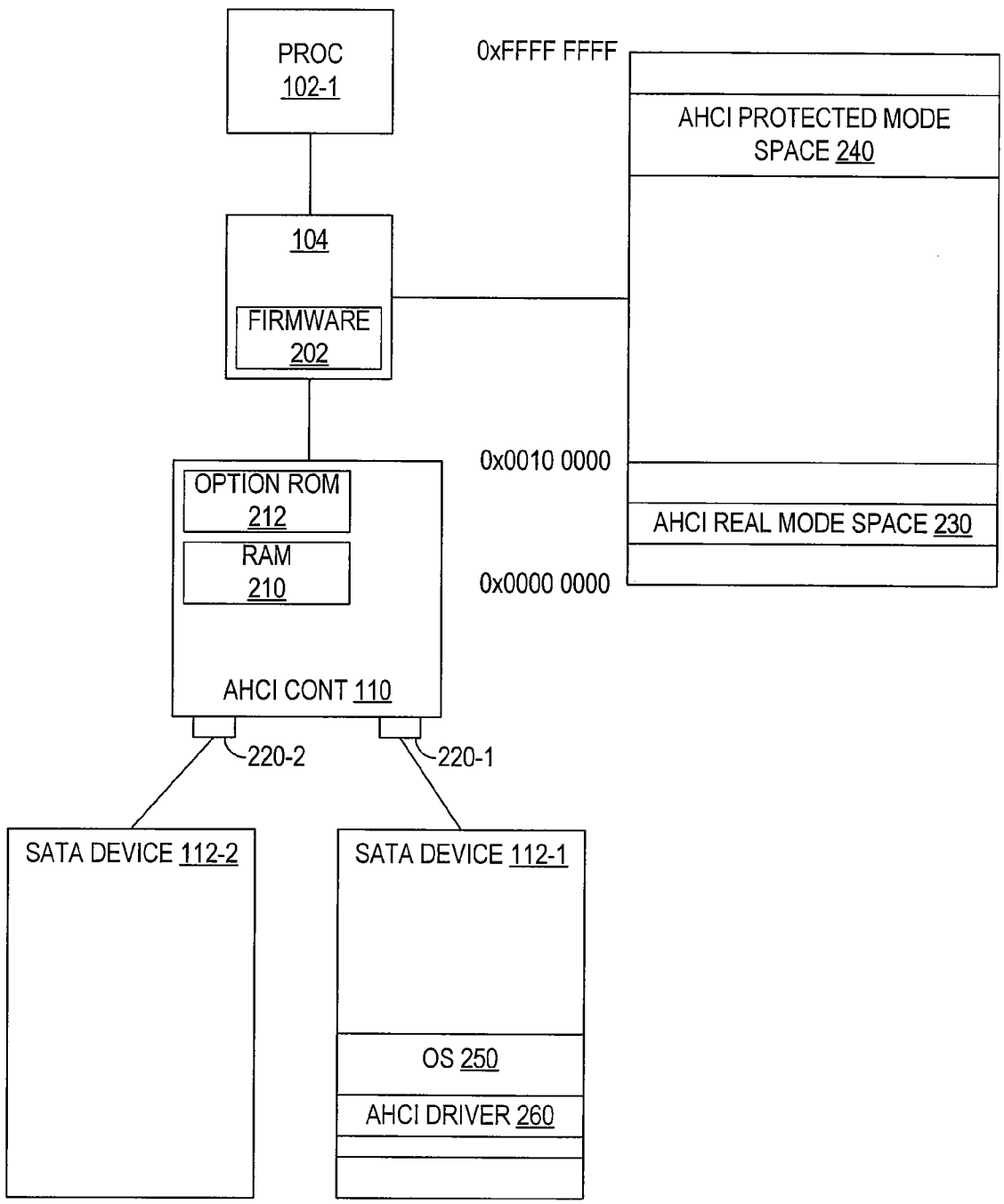
FIG. 2 is a block diagram of selected elements of the information handling system of FIG. 1 emphasizing elements of the storage device controller.

Referring now to FIG. 2, a conceptual depiction of selected software and hardware elements of information handling system 100 is presented. FIG. 2 emphasizes elements of system 100 that participate in the implementation and configuration of an AHCI controller or other form of persistent mass storage device controller. Although a specific implementation is shown and described, the controller implementation technique is applicable to a variety of implementations. As an example, although the depicted implementation of system 100 is shown as having two persistent mass storage devices in the form of serial ATA devices 112, other embodiments may employ more devices.

FIG. 2 depicts AHCI controller 110 as including a first port 220-1 and a second port 220-2. Other implementations of AHCI may include as many as 32 ports supported under the specification. The first port 220-1 is operably coupled to first SATA device 112-1 while second port 220-2 is operably coupled to second SATA device 112-2.

As depicted in FIG. 2, processor 102 is operable to execute firmware 202 in chipset 104. Firmware 202 may include, for example, the system's power on self test (POST) and/or basic input/output system (BIOS). In addition, firmware 202 preferably includes code to configure AHCI controller 110 directly or code to invoke firmware that is external to chipset 104 to configure AHCI controller. AHCI controller 110 may include, for example, firmware in the form of an option ROM 212 that includes code for configuring AHCI controller 110 for use in the real mode execution environment. Option ROMs are sometimes included with peripheral devices to provide vendor specific code that may be retrieved by BIOS code to enable communication with the peripheral device.

In the option ROM embodiment, the configuration code in option ROM 212 may be retrieved or called by the firmware 202. In other implementations, AHCI configuration code may be contained within firmware 202.

Regardless of where the AHCI configuration code is physically located, execution of the code by processor 102 configures AHCI by loading AHCI configuration registers located in controller RAM 210. The values loaded in the AHCI configuration registers have the effect of allocating a portion of system memory 120 as AHCI configuration space 230. As depicted in FIG. 2 and discussed previously, AHCI configuration space 230 is located in real mode accessible system memory space (i.e., below physical address 0x100000). For this reason, AHCI configuration space 230 is sometimes referred to herein as real mode configuration space 230 to distinguish it from a protected mode AHCI configuration space discussed below.

Real mode AHCI configuration space 230 includes, among other things, system memory space for a command list and for a frame information structure (FIS) block to store a FIS received from SATA device 112 or another permanent mass storage device. As described in greater detail below with respect to FIG. 3, real mode configuration space 230 according to one embodiment is smaller than the AHCI configuration space as described in the AHCI specification. Specifically, whereas the AHCI specification indicates a separate command list and FIS block for each port implemented on AHCI controller 110, AHCI controller 110 may be configured to use a common block of system memory for the command list and FIS of two or more persistent mass storage devices such as SATA devices 112.

Continuing with the embodiment depicted in FIG. 2, one or more of SATA devices 112 includes a multitasking operating system (OS) 250 suitable for executing in a protected mode operating environment of system 100 and processor 102. The depicted OS 250 is shown as including an AHCI driver 260.

In one embodiment, the reduced memory space implementation of AHCI controller 110 is enabled for use in real mode, for example, in a pre-OS environment (before the OS is loaded and executing). After OS 250 is loaded and begins to execute in protected mode (where the entire $2^{32}$ bytes of system memory address space are available), OS 250 may invoke device driver 260 to implement and configure AHCI controller in a more conventional manner in which separate command lists and FIS blocks are specified for each controller port. This larger, protected mode AHCI configuration space 240 is shown in FIG. 2 as residing in extended system memory space (above 0x100000) where 40 KB of system memory is comparatively generally not sufficient large to warrant significant concern.

Figure 3:
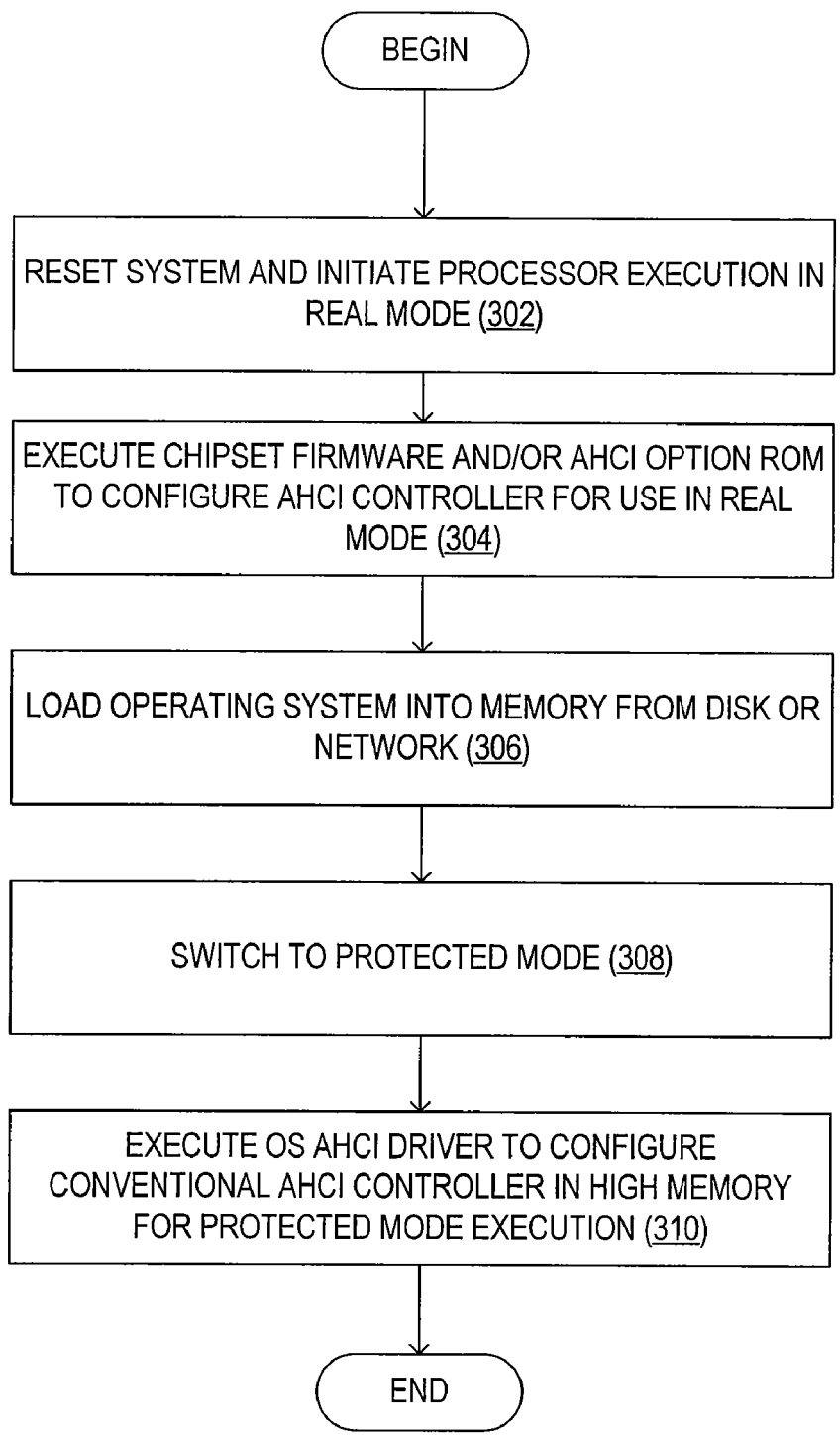
FIG. 3 is a flow diagram of a method of implementing a persistent mass storage device controller in the information handling system of FIG. 1.

Turning now to FIG. 3, a flow diagram illustrates a method 300 of implementing persistent mass storage in information handling system 100. In the depicted embodiment, method 300 is initiated when information handling system 100 is reset (block 302). Following reset, as described previously, processor 102 begins to execute chipset firmware 202 in its real mode operating environment. In an embodiment of system 100 that includes an option ROM 212 on AHCI controller 110, chipset firmware 202 may invoke (block 304) code stored in option ROM 212 to configure AHCI controller for real mode operation.

The preferred implementation of configuring AHCI controller 110 for real mode operation includes configuring AHCI controller 110 to define a real mode AHCI space 230 in a portion of system memory that is accessible in real mode. Real mode AHCI space 230 includes one or more data structures that is/are shared between two or more ports 220 of AHCI controller 110. In one implementation, for example, AHCI controller 110 is configured to use a single block of system memory in real mode AHCI space 230 for the command list of every port 220 and a single block of memory in real mode AHCI space 230 for the received FIS block of every port 220. Because each command list and FIS structure defined by AHCI controller 110 consumes 1280 bytes of system memory, sharing command lists and FIS structures among as many as 32 AHCI ports produces a system memory savings of almost 40 KB. Sharing the AHCI configuration space data structures is permissible in real mode environments, in which only a single thread is permitted to execute, because the single thread cannot simultaneously access two AHCI ports. In addition, because the option ROM code has full control over the AHCI configuration, it can guarantee a stable environment with which external processes and events cannot interfere (e.g., by disabling interrupts).

Figure 4:
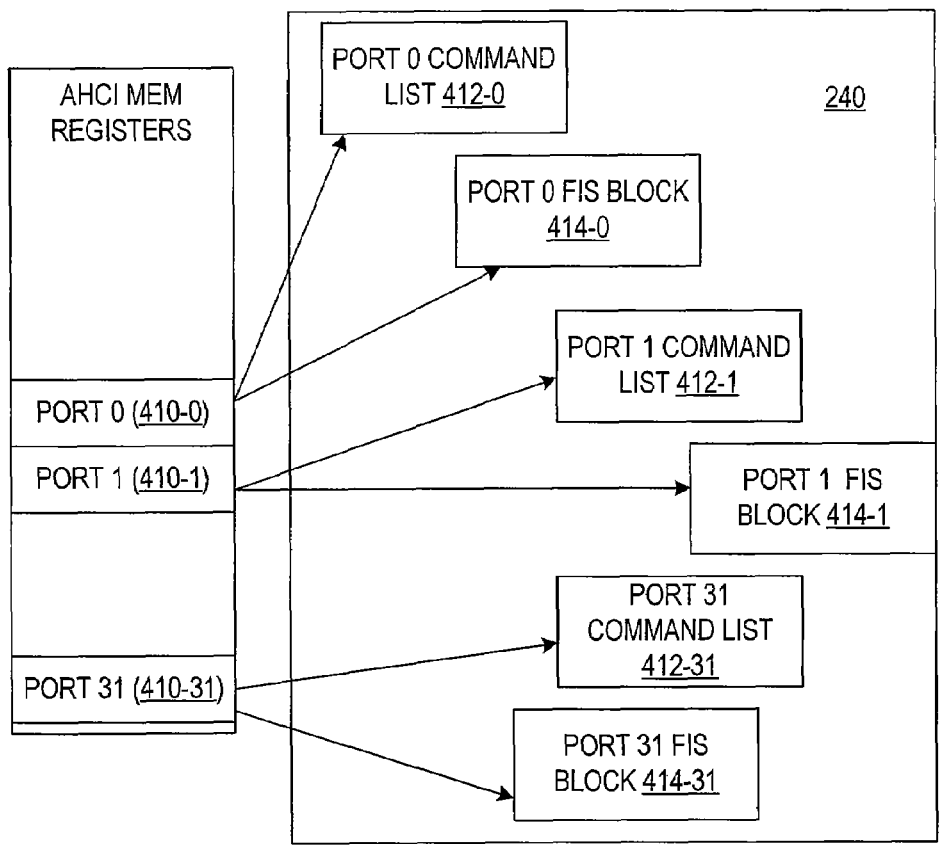
FIG. 4 is a conceptual representation of an AHCI configuration suitable for use when information handling system of FIG. 1 is operating in a protected mode environment.
Figure 5:
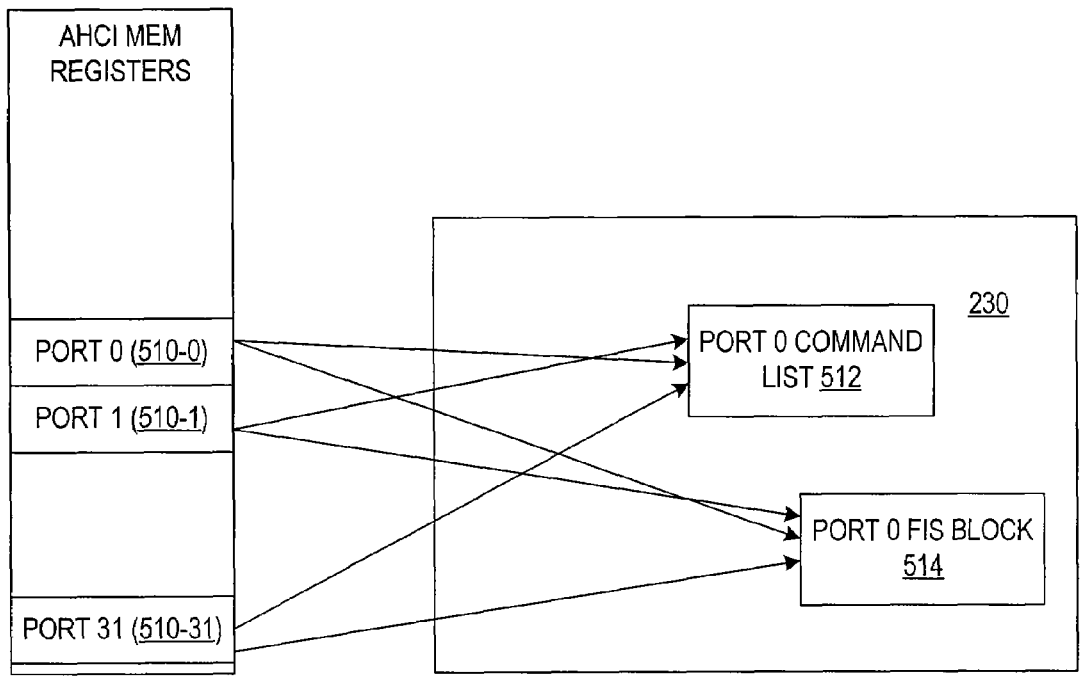
FIG. 5 is a conceptual representation of an AHCI configuration suitable for use when information handling system of FIG. 1 is operating in a real mode environment.

Referring momentarily to FIG. 4 and FIG. 5, conceptual depictions of conventional AHCI implementations (FIG. 4) and a condensed AHCI configuration (FIG. 5) are presented to emphasize the distinction between the two implementations. In both implementations, AHCI port configuration is defined a set of memory registers 410-0 through 410-31 in AHCI RAM 210, with one set of registers 410 for each AHCI controller port 220. In the conventional AHCI configuration of FIG. 4, each set of port registers 410 defines a corresponding pair of memory blocks including a command list block 412 and a received FIS block 414. Thus, for example, memory block 410-0 defines a port 0 command list 412-0 and a FIS block 414-0, memory block 410-1 defines a port 1 command list 412-1 and a FIS block 414-1, and so forth.

The set of memory registers 510-0 through 510-31 of the condensed AHCI implementation depicted in FIG. 5, on the other hand, all define the same pair of memory blocks, namely, the shared command list block 512 and the shared FIS block 514. As indicated previously, the condensed or shared AHCI implementation of FIG. 5 is not suitable for multithreaded environments in which a first thread may be accessing a first port (e.g., port 220-1) while a second thread is accessing a second port (e.g., port 220-2). Where single threaded execution is ensured, however, the condensed implementation produces a dramatic savings in allocated memory space, especially when the single threaded operating environment is also a limited memory environment.

Returning now to FIG. 3, following the configuration of a shared AHCI configuration (e.g., the configuration depicted in FIG. 5, in a real mode operating environment, all or part of an operating system 250 is loaded (block 306) into system memory 120. Operating system 250 is preferably a multithreaded, multitasking operating system. Following loading of operating system 250, the operating environment is switched (block 308) to protected mode execution, in which operating system 250 supports the simultaneous execution of multiple threads supporting multiple tasks and potentially accessing multiple persistent mass storage devices including, as examples, SATA devices 112.

Following the loading of the operating system and completion of the switch to protected mode execution, method 300 as depicted in FIG. 3 includes invoking (block 310) an AHCI driver 260 that comprises a portion of operating system 250. AHCI driver 260 is preferably responsible for reconfiguring AHCI controller 110 for use in a multithreaded operating environment. One embodiment of driver 260 reconfigures the AHCI configuration by creating a protected mode configuration space 240. In the preferred embodiment, as represented in FIG. 2, AHCI configuration space 240 is preferably located in extended memory (above 1 MB). In one embodiment, AHCI configuration space 240 is functionally equivalent to the conventional AHCI configuration depicted in FIG. 4, with each port register 410-1 through 410-31 defining its own corresponding and distinct command lists 412-0 through 412-31 and FIS blocks 414-0 through 414-31.

Although the disclosed embodiments have been described in detail, it should be understood that various changes, substitutions and alterations can be made to the embodiments without departing from their spirit and scope.

What is claimed is:
1. An information handling system comprising:
a processor;
a system memory coupled to the processor;
a plurality of persistent mass storage devices including first and second storage devices;
a controller including a first port operably connected to the first storage device and a second port operably connected to the second storage device, the controller being enabled to transfer data between the system memory and the storage devices; and instructions stored in computer readable media and executable by a processor, including instructions to configure the controller to:

define a shared command list including commands associated with both the first port and the second port, the shared command list configured for use during a single threaded mode of operation of the information handling system;

define a first command list associated with the first port and a separate second command list associated with the second port, the separate first and second command lists configured for use during a multi-threaded mode of operation of the information handling system.

2. The system of claim 1, wherein the plurality of persistent mass storage devices comprise a plurality of serial ATA (SATA) devices.

3. The system of claim 2, wherein the controller is an advanced host controller interface (AHCI) compliant controller.

4. The system of claim 3, further including instructions to configure the controller to:

store the shared command list in a shared block of system memory; and store the first and second command lists in separate blocks of system memory.

5. The system of claim 1, further including instructions to load an operating system including a driver for the controller, wherein the driver configures the controller to define the shared command list in a common block of system memory.

6. The system of claim 1, further including instructions to configure the controller to define the shared command list in a region of the system memory protected from a subsequently installed operating system.

7. The system of claim 1, further including instructions to configure the controller to define the shared command list in an extended BIOS data area (EBDA) of system memory.

8. A method for implementing persistent mass storage in an information handling system comprising:

configuring a controller of a plurality of persistent mass storage devices to use a shared block of system memory to store a shared command list for at least two of the plurality of persistent mass storage devices, the shared command list configured for use while executing in a pre-OS real mode operating environment; and configuring the controller of the plurality of persistent mass storage devices to use separate blocks of system memory to store separate command lists for each of the at least two persistent mass storage devices, the separate command lists configured for use while executing in a post-OS protected mode operating environment.

9. The method of claim 8, wherein the plurality of persistent mass storage devices comprise a plurality of serial ATA devices.

10. The method of claim 8, wherein configuring the controller comprises configuring an advanced host controller interface (AHCI) controller.

11. The method of claim 10, further comprising configuring the controller to use a second shared block of system memory to define a received frame information structure (FIS) while executing in the pre-OS real mode operating environment.

12. The method of claim 8, wherein configuring the controller to use the shared block of system memory to store the shared command list comprises configuring the controller to implement the shared block in an area of system memory protected from a subsequently installed operating system.

13. The method of claim 12, wherein configuring the controller to use a shared block of system memory to store the shared command list comprises configuring the controller to implement the shared block in an extended BIOS data area (EBDA).

14. A computer program product, comprising computer executable instructions stored on a computer readable medium, for implementing a persistent mass storage device controller, the instructions comprising:

instructions for defining, within a real mode operating environment, a first block of system memory for storing a shared command list corresponding to both a first port of a storage device controller and a second port of the storage device controller;

instructions for loading an operating system and transitioning from the real mode operating environment to a protected mode operating environment; and instructions for defining, within a protected mode operating environment, distinct blocks of system memory for storing separate command lists corresponding to the first and second ports of the storage device controller.

15. The computer program product of claim 14, wherein the storage device controller is a Serial ATA device controller.

16. The computer program product of claim 15, wherein the storage device controller is an AHCI controller.

17. The computer program product of claim 16, wherein the first block of system memory is accessible in the real mode operating environment.

18. The computer program product of claim 16, wherein the instructions for defining the first block of system memory comprise instructions for defining the first block of system memory as the shared command list associated with the first and second ports.

19. The computer program product of claim 18, further comprising instructions for defining a second block of system memory as a FIS (Frame Information Structure) block associated with the first and second ports.

* * * * *